United States Patent [19]

Weaver et al.

[11] 3,736,658
[45] June 5, 1973

[54] THERMIONIC GAS-PRESSURE-BONDED SHEATHED INSULATORS AND METHOD OF PRODUCING SAME

[75] Inventors: Cliff V. Weaver; William A. Ranken; Robert G. Lawton, all of Los Alamos, N. Mex.

[73] Assignee: The United States of America as represented by the United States Atomic Energy Commission, Washington, D.C.

[22] Filed: Oct. 12, 1970

[21] Appl. No.: 79,786

[52] U.S. Cl. .................29/631, 29/472.5, 29/472.9, 29/473.1
[51] Int. Cl. ............................................H01b 19/00
[58] Field of Search.....................29/472.9, 472.5, 29/473.1, 497.5, 498, 631

[56] References Cited

UNITED STATES PATENTS

| | | | |
|---|---|---|---|
| 2,647,218 | 7/1953 | Sorg et al. | 29/472.7 |
| 3,656,225 | 4/1972 | Bereza | 29/471.9 |

Primary Examiner—Charles W. Lanham
Assistant Examiner—James R. Duzan
Attorney—Roland A. Anderson

[57] ABSTRACT

The collector of a thermionic converter, an insulator, and a metal sheath for the insulator are directly gas-pressure-bonded together such that the trilayer thus formed is stress relieved and maintains good structural integrity during machining and during thermocycling caused by operation of the converter. The insulator is alumina and the collector and sheath consist either of niobium metal or Nb-1 wt percent Zr alloy.

19 Claims, 7 Drawing Figures

SECTION A a. NON-STRESS-RELIEVING SCHEDULE b. STRESS-RELIEVING SCHEDULE

INVENTOR.
Cliff V. Weaver, William A. Ranken,
Robert G. Lawton

THERMIONIC GAS-PRESSURE-BONDED SHEATHED INSULATORS AND METHOD OF PRODUCING SAME

The invention described herein was made in the course of, or under, a contract with the U.S. ATOMIC ENERGY COMMISSION. It relates to ceramic-to-metal bonds and more particularly to a cylindrical metal-to-cermic-to-metal bond for use with a thermionic converter.

Thermionic reactors are being developed for axiliary power and electrical propulsion applications in space. In such reactors, thermionic diodes (converters) are used to directly convert nuclear energy to electrical energy. A typical thermionic fuel rod for use in such a reactor is composed of a stack of individual diodes connected in series, i.e., the collector of one diode touches the emitter of the following diode, which adds the voltage of the individual cells. Each diode is composed of an emitter, a cesium gap, and a collector. The intercell region between emitters contains insulator spacers to prevent the shorting of adjacent collectors and the emitter support structure. The waste heat is removed from the reactor by a circulating liquid-metal coolant. Because this coolant would short-circuit adjacent collectors, an insulating layer must surround all the collectors in a stack. This insulating layer in turn must be protected from the circulating coolant by a metal sheath. The structure consisting of the collectors, the insulating layer, and the protective metal sheath is known as the trilayer.

Because of their similar coefficients of thermal expansion, niobium and alumina have received much consideration as components of this trilayer. In addition, alumina exhibits a better resistance to radiation damage than do many other ceramics.

In the prior art, a desirable and straightforward method of bonding the components of the trilayer together has been through use of hot gas, isostatic pressure bonding, but a significant problem heretofore in the formation of direct pressure-bonded niobium-to-alumina seals has been the difficulty of avoiding the formation of stresses which cause fracturing in the seal or the ceramic (1) during or shortly after the bonding process, (2) during machining of the trilayer, or (3) during operation of the thermionic diode. Such fracturing greatly increases the thermal resistance within the trilayer. It also allows electrical shorting to the outside protective sheath through cesium vapor penetrating the cracks.

In U. S. Pat. No. 3,324,543, McVey et al. reveal a method for the formation of a niobium-to-alumina gradient seal in which stress formation is relieved in a transition zone between the niobium and the alumina. The transition zone is formed by placing a powder consisting of a mixture of niobium and alumina with a high metal-to-ceramic concentration next to the niobium and grading to a high ceramic-to-metal concentration next to the alumina. A metal-to-ceramic seal is produced according to a bonding schedule in which the pressure is released before the temperature such that stress relieving occurs. There are a number of disadvantages to this process. First, it is a multistep process. Secondly, the transition zone requires a certain thickness which can prevent the bonding of thin trilayers. Third, the bonding schedule therein disclosed is more than 200 hours in length (see lines 39 through 46 of that patent) and is therefore unrealistically long. Fourth, and perhaps more importantly, to the present inventors' knowledge, graded seals cannot be made in cylindrical configurations.

An alternative approach is to avoid the trilayer configuration completely and bind the niobium collector to the niobium protective sheath by means of a cermet seal consisting of graded layers of alunina-coated niobium. No solid layer of alumina is present, but the alumina coating on the niobium particles is sufficient to maintain electrical resistivity while yet allowing good thermal conductivity. See, for example, "A High Temperature, Electrically Insulating Cermet Seal Having High Strength and Thermal Conductance," by W. B. Kaufman et al., presented at the 1967 Thermionic Conversion Specialists Conference, Oct. 30-Nov. 1, 1967, Palo Alto, California. The disadvantages of this bonding approach are again that it is a multistep process, and secondly, that the coating of niobium with alumina represents an expensive step which greatly increases the cost of the overall bonding method.

These gradient seals represent mechanical bonding between the niobium and the alumina. While they satisfactorily relieve stress formation, they are produced by lengthy, multistaged, and indirect processes. The prior art reveals no satisfactory technique by which stress-relieved metal-to-ceramic bonds can be directly achieved with cylindrical configurations.

We have now discovered that by using a simple hot-gas, isostatic pressure-bonding process in which the pressure is released before the temperature, and the bonding schedule is short in comparison to that revealed by McVey et al., we can directly bond niobium to alumina to form a cylindrical, machinable, stress-relieved trilayer having excellent electrical resistance, good thermal conductivity, and good structural characteristics. We have also found that this method can be applied to the bonding of Nb-1 wt percent Zr to alunina. The resulting diffusion bond is chemical in nature and tends to be stronger than a mechanical bonding between niobium and alumina. While mechanical bonding between niobium and alumina is old in the art, we beleve that formation of a cylindrical Nb-1 wt percent Zr/Al$_2$O$_3$/Nb-1 wt percent Zr diffusion bonded trilayer has not heretofore been disclosed for use with thermionic converters.

It is therefore an object of this invention to provide a faster and simpler process by which niobium can be directly gas pressure bonded to alumina to form a stress-relieved trilayer for use with a thermionic converter. A further object is to provide a process by which a trilayer for use with a thermionic converter can be directly gas pressure bonded in a cylindrical configuration. Yet another object is to provide an improved thermionic converter trilayer comprising difussion bonded Nb-1 wt percent Zr/Al$_2$O$_3$/Nb-1 wt percent Zr.

Although niobium and alumina are generally acknowledged to have similar coefficients of thermal expansion, the published literature clearly indicates that they are not nearly identical. See, for example, FIG. 1 of "Metal-to-Ceramic Seals for Thermionic Converters, a Literature Survey," by W. M. Phillips, JPL-TR-32-1420 (Nov. 1, 1969). There is therefore a widely held belief by those of reasonable skill in the art that stresses set up in gas-pressure-bonded trilyers are a result of the slight but significant disparity in thermal expansions of niobium and alumina. This belief has been reinforced by the fact that trilayers gas pressure bonded according to the more standard but nonstress-relieving schedule of part A of FIG. 3 almost invariably tend to fracture shortly after being bonded or during machining.

Figure 1:
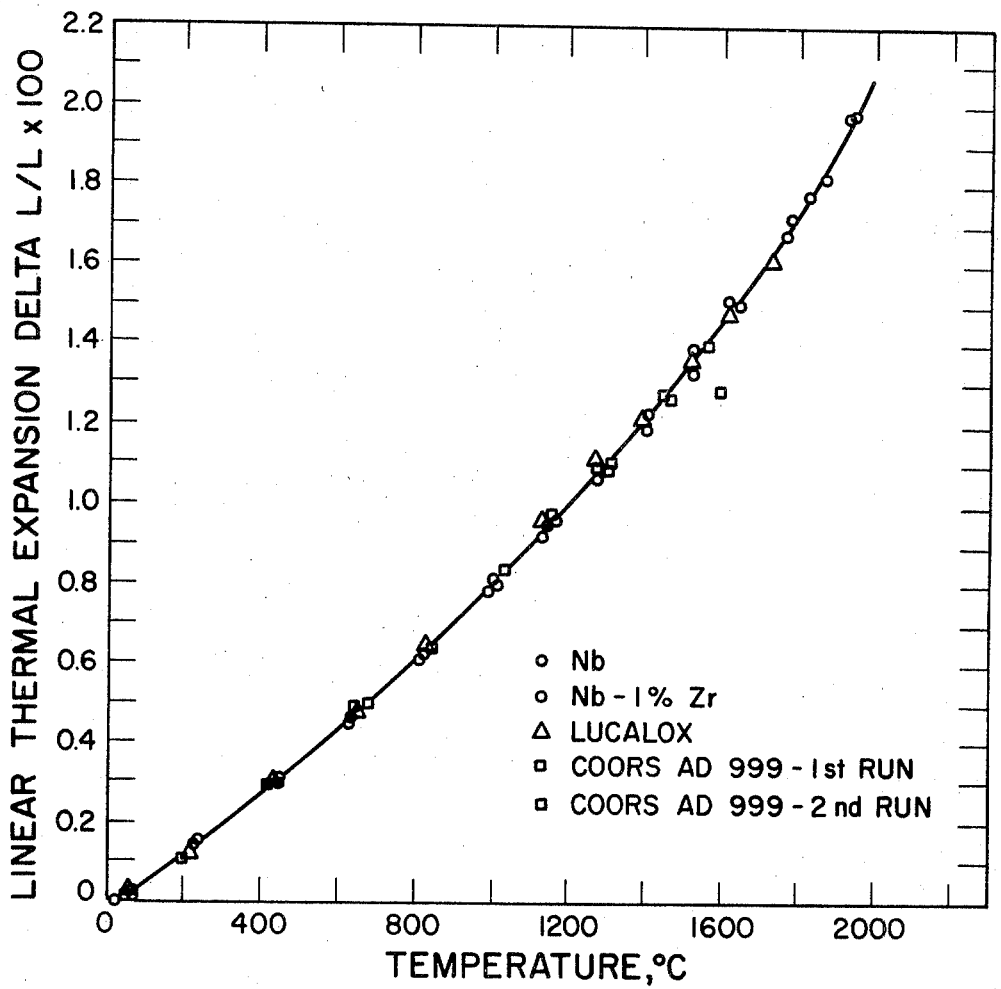
FIG. 1 shows the variation in thermal expansion with temperature of Nb, Nb-1 wt percent Zr, and two types of Al$_2$O$_3$.

Employing identical techniques on all samples, we have now carefully remeasured the thermal expansions of Nb, Nb-1 wt percent Zr, and two types of $Al_2O_3$. The results are shown in FIG. 1 where Lucalox and Coors AD 999 are trademarks or trade designations for $Al_2O_3$ manufactured by General Electric and Coors, respectively. These measurements indicate that the differences in the coefficients of thermal expansion of Nb, Nb-1 wt percent Zr, and $Al_2O_3$ over a temperature range of 25° to 1800°C are so small as to be considered negligible. Consequently, it is highly unlikely that significant thermal stresses occur during cooldown.

Figure 2:
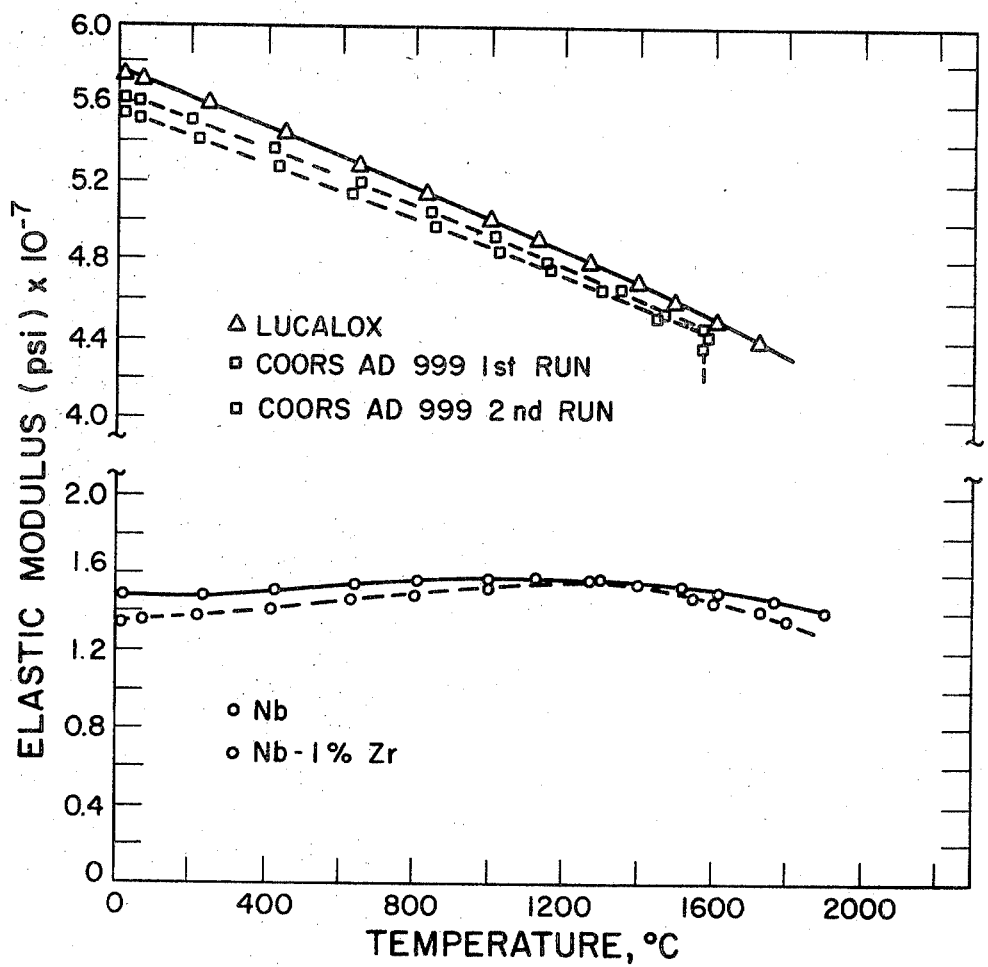
FIG. 2 shows the variation in modulus of elasticity with temperature of Nb, Nb-1 wt percent Zr, and two types of Al$_2$O$_3$.

Whereas the coefficients of thermal expansion of these materials appear almost identical, the same is not true of their elastic moduli. The substantial difference between the modulus of elasticity of $Al_2O_3$ and that of the Nb and Nb-1 wt percent Zr is evident in FIG. 2. Calculations show that it is this mismatch in the elastic moduli and the resultant stresses that are induced when the pressure is released according to a bonding schedule such as that given in part A of FIG. 3 that is chiefly responsible for the fracturing that occurs. The stresses thus produced exceed the tensile strength of the $Al_2O_3$.

However, the creep rates of Nb, Nb-1 wt percent Zr, and $Al_2O_3$ at temperatures of 1500°C and above are very high. This indicates that the stresses induced by the release of pressure can be relieved by the creep of the components if pressure release occurs slowly before the temperature is reduced. Once the pressure is released, the temperature can be rather rapidly reduced since the lack of any significant difference in the coefficients of thermal expansion precludes the introduction of any appreciable new stresses during cooldown. The assemblies can therefore be allowed to cool quickly and normally in the pressure vessel, once pressure release has been essentially completed.

Although the nearly identical coefficients of thermal expansion of $Al_2O_3$, Nb, and Nb-1 wt percent Zr appear to be fortuitous circumstance, it is quite possible that certain other metal-ceramic combinations exist which also exhibit this circumstance. Where the combination—or at least the ceramic member—also has a high creep rate at an appropriate elevated temperature, thermal stresses do not prevent a direct stress-relieved metal-to-ceramic bonding by means of hot-gas, isostatic pressure techniques.

Figure 3:
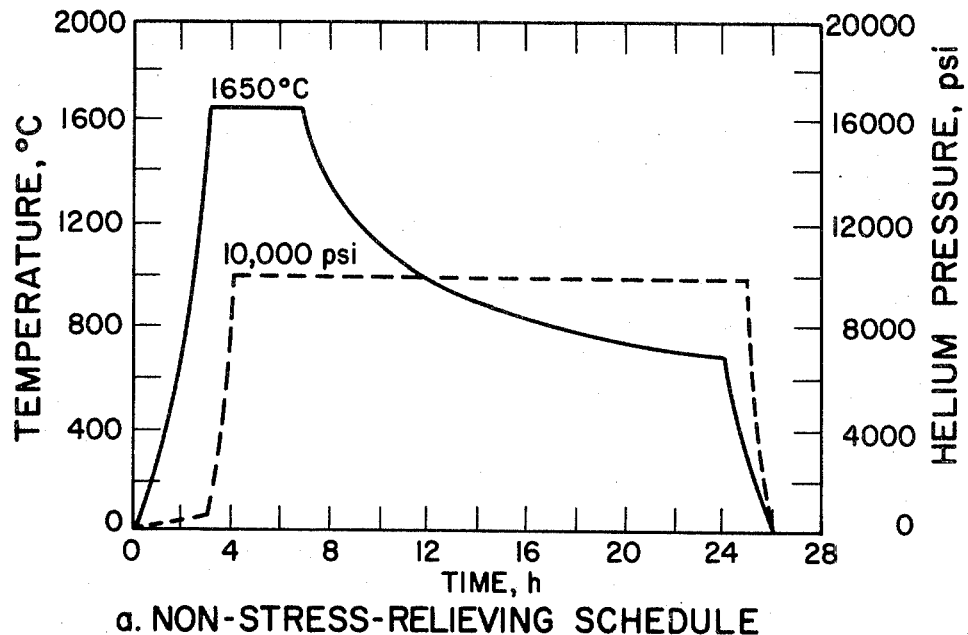
FIG. 3 shows typical pressure bonding schedules for the production of trilayers.
Figure 3:
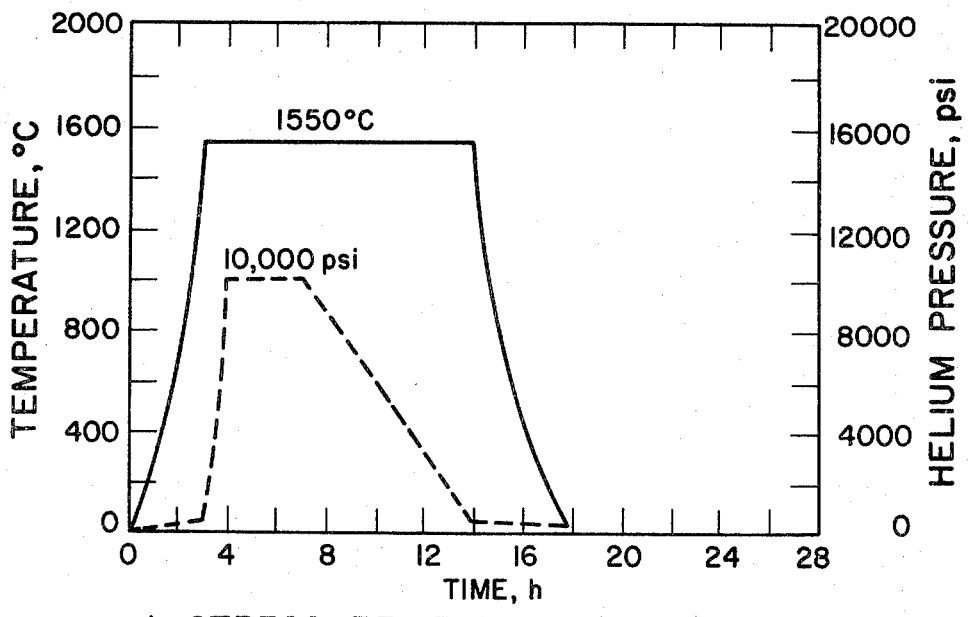

Based upon these facts, the stress-relieving schedule shown in part B of FIG. 3 was developed. Initially, a pressure release period of 2 hours was tried. Post-autoclaving examination of the trilayer (made by etching the outer sheath away from the ceramic) revealed no cracks or other evidence of fracturing in the ceramic; however, attempts to machine assemblies that had undergone only 2 hours of pressure release invariably caused them to crack at some point in the operation. This was indicative of a failure to achieve complete stress relief. This problem no longer occurred when the pressure release period was extended to 7 hours as shown in the schedule of part B of FIG. 3. Using this schedule, stress-relieved, easily machinable trilayers comprising either Nb and $Al_2O_3$ or Nb-1 wt percent Zr and $Al_2O_3$ can readily be bonded. The bond strengths of Nb-1 wt percent $Zr/Al_2O_3$/Nb-1 wt percent Zr trilayers have been found to be of the order of 7500 psi when measured at 750°C. The bond strengths of $Nb/Al_2O_3$/Nb trilayers, which have been measured only at 20°C or less, were of the order of 5000 psi. These values are thought to be conservative because tensile testing was performed on curved specimens only 0.250-inch wide by 0.375-inch long. These were brazed into Nb-1 wt percent Zr grip adapters. Since perfect axial alignment of the brazed assemblies was unlikely, asymmetric forces on the trilayer specimen may have caused premature failure.

It is well known that at temperatures below 1800°C there is almost no reaction between Nb and $Al_2O_3$ so that any bond that occurs should be essentially mechanical in nature. Electron microprobe analyses of $Nb/Al_2O_3$ bonds formed according to the bonding schedule of this invention confirm that even under 10,000 psi pressure the bond produced is mechanical. Because the bonding force depends on mechanical interlocking, a smooth ceramic surface results in a correspondingly weak ceramic-to-metal bond. For this reason it is desirable that $Al_2O_3$ surfaces bound to Nb according to the process of this invention be rough.

Figure 5:
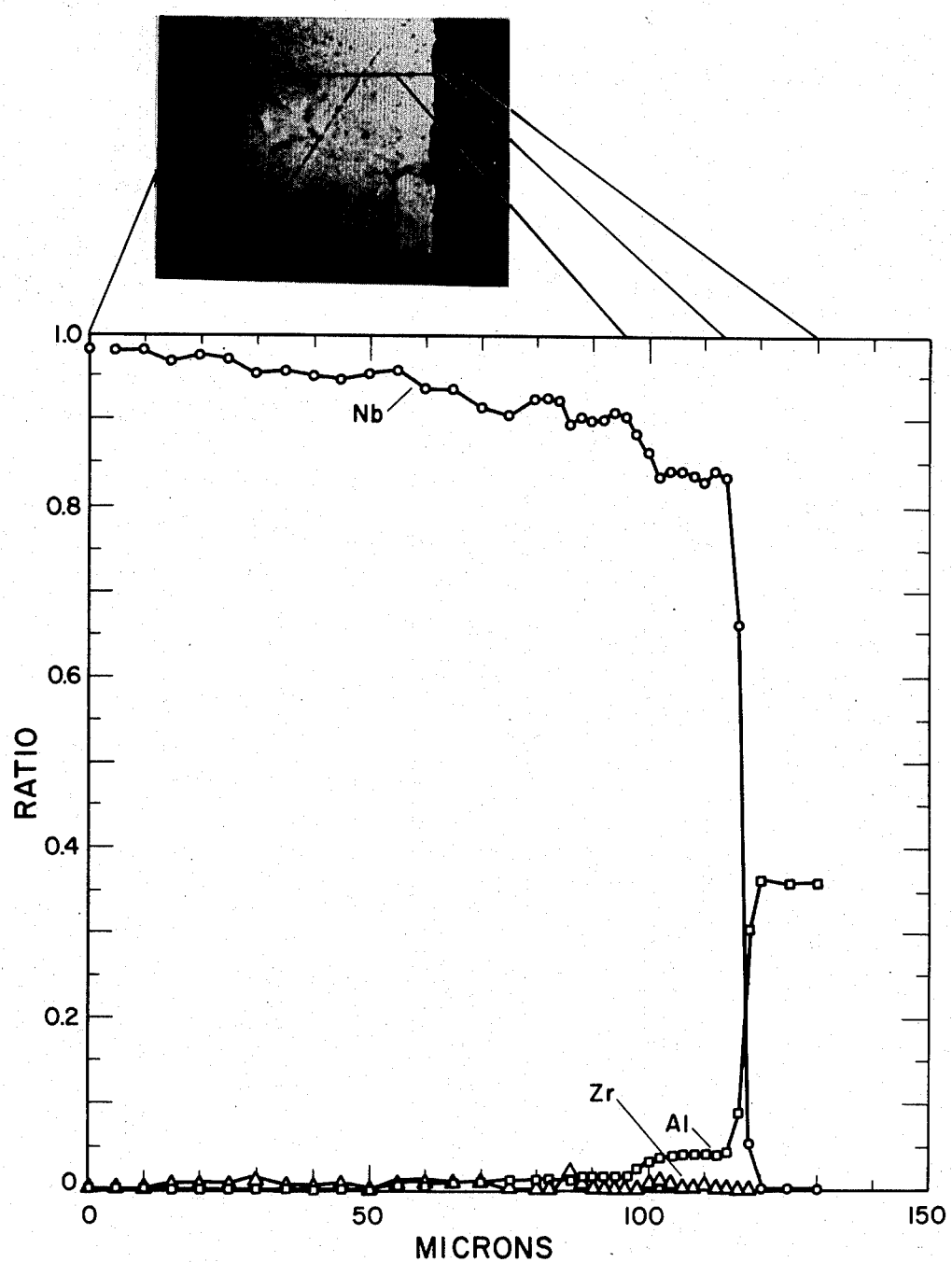
FIG. 5 is a photomicrograph of a diffusion bond between Nb-1 wt percent Zr and Al$_2$O$_3$ together with an electron microprobe chart showing the content of certain species within various parts of the photomicrograph.

As can be seen from FIG. 5, a very different type of bond is formed at the Nb-1 wt percent $Zr/Al_2O_3$ interface. The electron microprobe data give clear evidence of a strong chemical reaction resulting in a diffusion bond in addition to a mechanical bond. The Nb-1 wt percent Zr alloy was originally chosen for use in a trilayer because it exhibited superior mechanical and chemical stability at high temperatures as compared to pure Nb. The discovery that this alloy would produce a diffusion bond with $Al_2O_3$ was serendipitous. Diffusion bonds are usually preferred over purely mechanical bonds because of their higher strengths and greater reliability at elevated temperatures and after thermal cycling.

The following explanation has been proposed for the reaction at a Nb-1 wt percent $Zr/Al_2O_3$ interface and the lack of it at a $Nb/Al_2O_3$ interface. At temperatures above 1400°C, the Zr in the Nb-1 wt percent Zr attacks the $Al_2O_3$ in the reaction

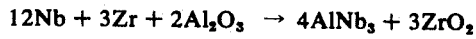

It is the bimetallic $AlNb_3$ which is formed at the interface between the Nb-1 wt percent Zr and the $Al_2O_3$ that provides the diffusion bond between them. The reaction proceeds more rapidly with increasing temperature. High external gas pressure and the relatively plastic condition of the components at high temperatures maximizes the interfacial contact. For these reasons, temperatures of the order of 1550°C and pressures of the order of 10,000 psi are typical of this gas pressure bonding process.

Figure 4:
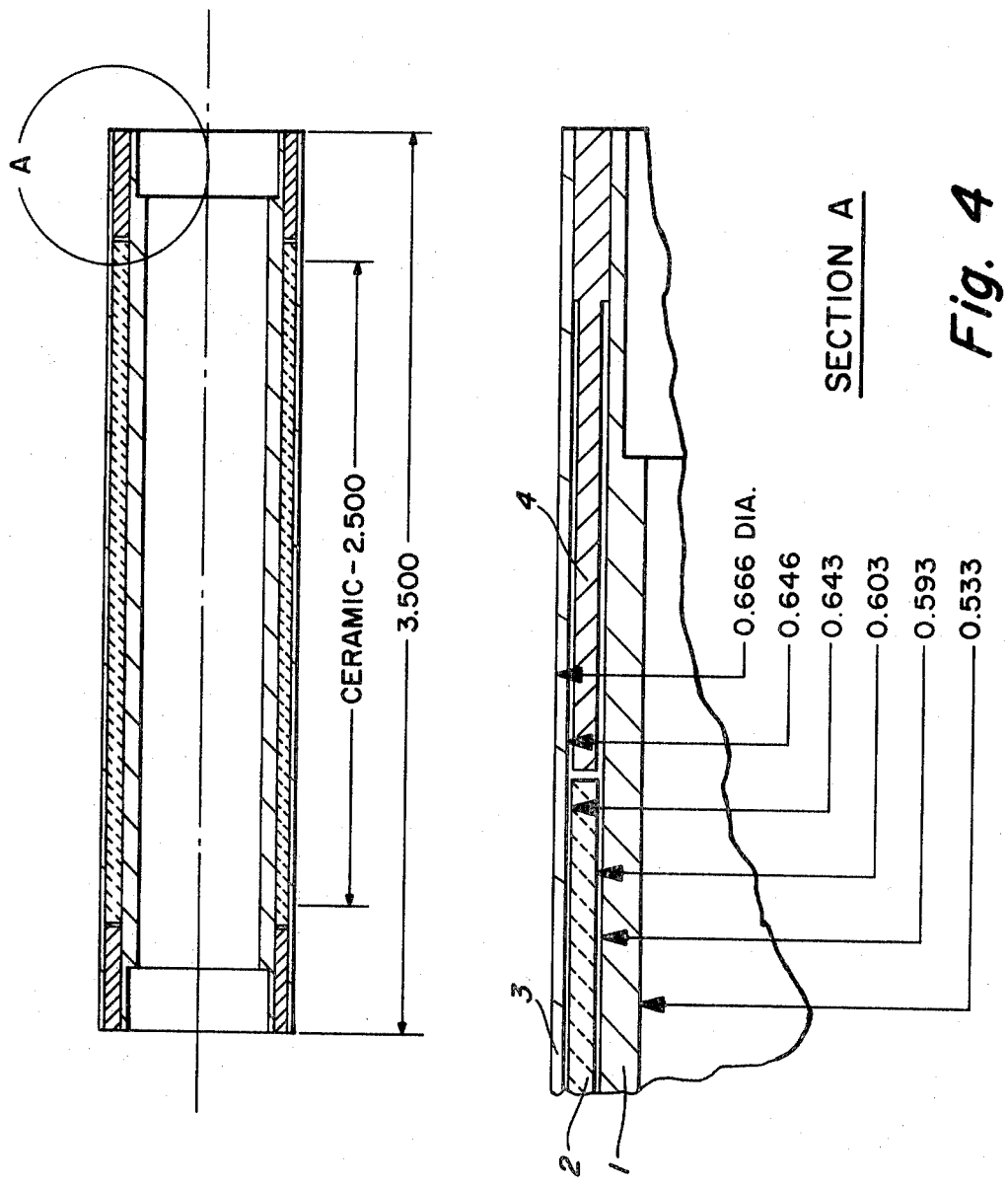
FIG. 4 shows a cutaway view of the trilayer together with an enlarged section thereof.

An unbonded thermionic converter trilayer, such as that shown in FIG. 4, is fabricated as follows. Three coaxial cylinder—an inner sheath 1 of Nb or Nb-1 wt percent Zr 0.030-inch thick, a center cylinder 2 of $Al_2O_3$ 0.020-inch thick, and an outer sheath 3 of Nb or Nb-1 wt percent Zr 0.010-inch thick—are machined with the metal cylinders 1 and 3 somewhat longer than the $Al_2O_3$ cylinder 2. Metal filler rings 4 which are inserted at either end of the $Al_2O_3$ cylinder 2 such that it will then be completely jacketed by the metal are also prepared. The radial clearance between the outer sheath and the $Al_2O_3$ is about 0.001 to 0.002 inch with about 0.004 to 0.006 inch between the inner sheath and the $Al_2O_3$. The clearance between the end rings and the $Al_2O_3$ is less than 0.010 inch.

Before assembly, the metal components are lightly etched with an equal-parts solution of distilled $H_2O$, $HNO_3$, and HF, ultrasonically rinsed in distilled $H_2O$, and outgassed for 20 minutes in a $10^{-6}$ torr vacuum at 1250°C. The ceramic is ultrasonically cleaned in a detergent solution (e.g., Liqui-Nox), ultrasonically rinsed in distilled $H_2O$, and fired for 1 hour in air at 1250°C. The parts are then assembled in a clean room and the metal components are electron-beam welded together (see, e.g., welds 5 in FIG. 4) in a $10^{-6}$ torr vacuum such that the $Al_2O_3$ is completely jacketed by the metal and a vacuum exists at the interface between the metal and the $Al_2O_3$.

The dimensions given in FIG. 4 are those of the unbonded components of the trilayer after welding has occurred. The trilayer is then directly gas-pressure bonded in a helium atmosphere according to a schedule similar to that shown in part B of FIG. 3. The bonded trilayer has an i.d. of about 0.5 inch and an o.d. of about 0.65 inch. The final cylinder is 3.5 inches long.

Figure 6:
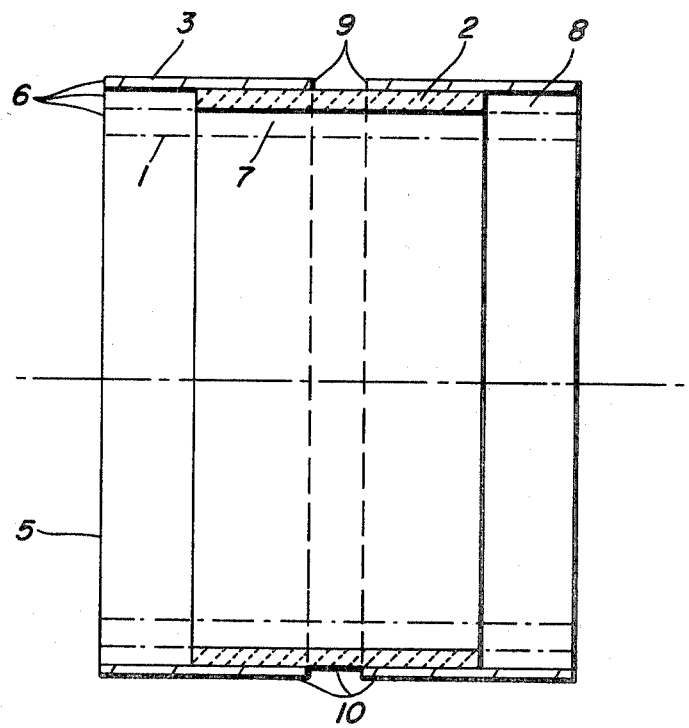
FIG. 6 is a ceramic-to-metal seal fabricated from a cylindrical Nb-1 wt percent $Zr/Al_2O_3$/Nb-1 wt percent Zr trilayer.

The trilayer thus produced can be readily converted to a wide range of configurations of ceramic-to-metal seals useful in many high-temperature electronic, nuclear, or thermionic application. For example, a typical seal such as that shown in FIG. 6 can be made from the trilayer in the following fashion. A cylindrical section 5 of a desired overall length is cut from a Nb-1 wt percent Zr/$Al_2O_3$/Nb-1 wt percent Zr trilayer 6. The Nb-1 wt percent Zr inner sheath 1 is etched away 7 with an equal-parts solution of distilled $H_2O$, $HNO_3$, and HF. The $Al_2O_3$ 2 is then ground back 8 from the cylinder ends with a diamond wheel and the outside Nb-1 wt percent Zr sheath 3 is parted as desired 9 by machining and by a final etch if necessary. No unusual machining or etching techniques are required since the trilayer after forming is practically free from stresses. The net result is a ceramic-to-metal seal 10 consisting of an $Al_2O_3$ segment diffusion bonded to two separate pieces of Nb-1 wt percent Zr alloy. Because the Nb-1 wt percent Zr can readily be joined to other metals this ceramic-to-metal seal can be used in a wide range of applications.

Figure 7:
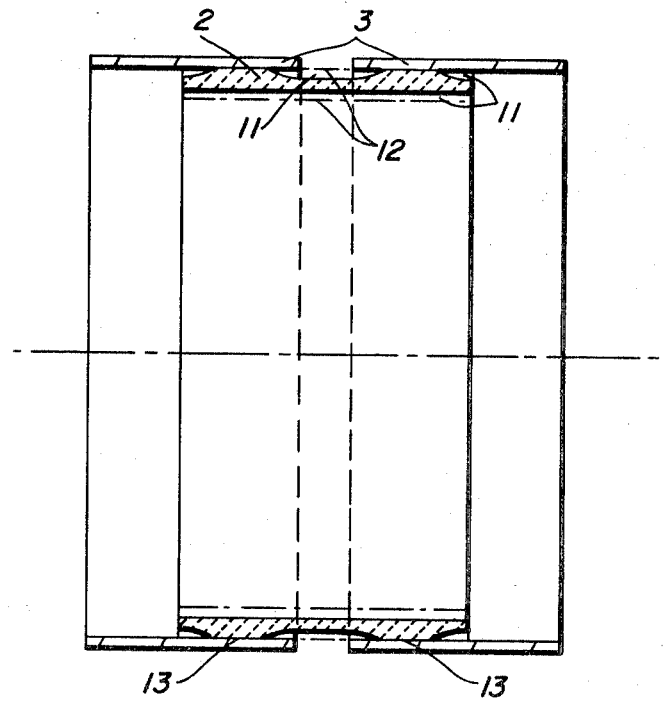
FIG. 7 shows the seal of FIG. 6 after cycling five times from less than 500°C to 1750°C and 50 hours of continuous firing at 1750°C.

Seals made by this method have a high degree of integrity over a wide range of temperatures. A sample seal has been thermally cycled ten times from less than 100°C to 800°C allowing 15 minutes for each cycle. It was then cycled five times from less than 500°C to 1750°C at heating and cooling rates up to 500°C per minute. At the end of these tests the seal was undamaged and helium leak tight. The same seal was heated to 1750°C for 50 hours. At this temperature $Al_2O_3$ has a considerable vapor pressure so that as shown in FIG. 7 the $Al_2O_3$ layer 2 lost a substantial portion of its mass 11 from its exposed surfaces 12. However, the seal 13 remained leak tight.

It will be apparent to one of reasonable skill in the art that what has been disclosed is a simpler and faster method for forming thermionic converter trilayers which comprises directly gas-pressure bonding $Al_2O_3$ and Nb or Nb-1 wt percent Zr. It will be further noted that an improved trilayer comprising diffusion-bonded Nb-1 wt percent Zr/$Al_2O_3$/Nb-1 wt percent Zr has been revealed. It will be understood that the utility of the trilayers herein disclosed is not limited to thermionic converters used in conjunction with thermionic reactors or with heat sinks utilizing liquid metals, although they do have a high degree of compatibility with liquid metals such as Na or NaK. Finally, one of reasonable skill in the art will realize that the trilayers and method for making them are not limited to the components, configurations, or dimensions disclosed by example herein, but that the cylindrical configuration shown represents one of the most difficult configurations required to be bonded. Such a person would also be aware that any significant change in the dimensions of the components of the trilayer or in the components themselves might also require a change in the stress-relieving bonding schedule to compensate therefor.

Those skilled in the art will also be cognizant of the numerous ways in which ceramic-to-metal seals of varying geometry can readily be fashioned from trilayers. They will also readily realize that seals such as that disclosed by example herein have a wide range of utility in the electronic and nuclear arts—particularly in high temperature applications. What we claim is:

1. A method of producing a machinable, stress-relieved, pressure-bonded, metal-sheathed electrical insulator for use in a thermionic converter which comprises: (a) forming an evacuated, gas-tight metal jacket free of any coating and in direct contact with a ceramic, said metal and said ceramic having closely similar coefficients of thermal expansion and high creep rates at sufficiently elevated temperatures, (b) subjecting said jacketed ceramic to a combination of temperature and pressure sufficient to bond contacting metal-ceramic surfaces within said jacketed ceramic, said temperature also being sufficient to produce a high creep rate in said ceramic and metal components, (c) holding at said temperature while slowly reducing the pressure to ambient over a time sufficient to stress relieve said bond, and (d) then reducing the temperature to ambient.

2. The method of claim 1 wherein said metal jacket is selected from the class consisting of niobium and Nb-1 wt percent Zr alloy and said ceramic is alumina.

3. The method of claim 2 wherein said ceramic has a cylindrical configuration.

4. The method of claim 3 wherein (a) said jacketed cylinder is heated to 1550°C in a helium atmosphere, (b) at 1550°C said jacketed cylinder is subjected to a helium gas pressure of 10,000 psi and held at said pressure and temperature for 3 hours, (c) the pressure is then slowly reduced to near ambient over about a 7-hour period while the temperature remains constant at 1550°C, and (d) the temperature is then reduced to ambient.

5. The method of claim 4 wherein said metal jacket is niobium.

6. The method of claim 4 wherein said metal jacket is Nb-1 wt percent Zr alloy.

7. A method of producing a thermionic converter trilayer which comprises: (a) forming an evacuated, gas-tight metal jacket around and in close proximity to a ceramic cylinder, said metal jacket being selected from the class consisting of niobium and Nb-1 wt percent Zr alloy and said ceramic cylinder being alumina, (b) heating said jacketed cylinder to 1550°C in a helium atmosphere, (c) at 1550°C subjecting said jacketed cylinder to a helium gas pressure of 10,000 psi and holding it at said pressure and temperature for 3 hours, (d) slowly reducing the pressure to near ambient over about a 7-hour period while the temperature remains constant at 1550°C, and (e) then reducing the temperature to ambient.

8. The method of claim 7 wherein said metal jacket is niobium.

9. The method of claim 7 wherein said metal jacket is Nb-1 wt percent Zr alloy.

10. In a thermionic converter having (a) a Nb-1 wt percent Zr collector, (b) a heat sink for removing heat from said collector, (c) an $Al_2O_3$ electrical insulator in contact with said collector and between said collector and said heat sink, (d) a Nb-1 wt percent Zr protective metal sheath for said insulator, (e) an emitter spaced from said collector, (f) an easily ionized gas between said emitter and collector, (g) a heat source, (h) heat transferring means for heating said emitter and ionizing said gas by said heat source, and (i) means for taking out the electrical power generated between said emitter and collector, the improvement consisting of a stress-relieved diffusion bond between said insulator and said collector and said protective metal sheath.

11. A thermionic converter trilayer comprising stress-relieved, diffusion bonded Nb-1 wt percent $Zr/Al_2O_3$/Nb-1 wt percent Zr.

12. A machinable, stress-relieved electrical insulator for use in a thermionic converter which comprises diffusion-bonded Nb-1 wt percent $Zr/Al_2O_3$/Nb-1 wt percent Zr.

13. A method of producing a machinable, stress-relieved, pressure-bonded ceramic-to-metal seal which comprises: (a) forming an evacuated gas-tight metal jacket around and in close proximity to a ceramic, said metal and said ceramic having closely similar coefficients of thermal expansion and high creep rates at sufficiently elevated temperatures, (b) subjecting said jacketed ceramic to a combination of temperature and pressure sufficient to bond contacting metal-ceramic surfaces within said jacketed ceramic, said temperature also being sufficient to produce a high creep rate in said ceramic and metal components, (c) holding at said temperature while slowly reducing the pressure to ambient over a time sufficient to stress relieve said bond, (d) reducing the temperature to ambient, (e) cutting the jacketed ceramic to a desired length, (f) etching away one side of the metal jacket, (g) machining the $Al_2O_3$ away from the ends of the remaining metal jacket as desired, and (h) parting the remaining metal jacket as desired by machining.

14. The method of claim 13 wherein said metal jacket is selected from the class consisting of niobium and Nb-1 wt percent Zr alloy and said ceramic is alumina.

15. The method of claim 14 wherein said ceramic has a cylindrical configuration.

16. The method of claim 15 wherein (a) said jacketed cylinder is heated to 1550°C in a helium atmosphere, (b) at 1550°C said jacketed cylinder is subjected to a helium gas pressure of 10,000 psi and held at said pressure and temperature for 3 hours, (c) the pressure is then slowly reduced to near ambient over about a 7-hour period while the temperature remains constant at 1550°C, and (d) the temperature is then reduced to ambient.

17. The method of claim 16 wherein said metal jacket is niobium.

18. The method of claim 16 wherein said metal jacket is Nb-1 wt percent Zr alloy.

19. A ceramic-to-metal seal for use in a high temperature environment which comprises Nb-1 wt percent Zr diffusion bonded to $Al_2O_3$.

* * * * *